United States Patent
Ghosh et al.

(10) Patent No.: US 12,222,213 B2
(45) Date of Patent: Feb. 11, 2025

(54) DIGITAL TWIN BASED BINAURAL AUDIO ECHOLOCATION

(71) Applicant: International Business Machines Corporation, Armonk, NY (US)

(72) Inventors: Partho Ghosh, Kolkata (IN); Vinod A. Valecha, Pune (IN); Aruna Ratna Kumari Peketi, Visakhapatnam (IN); Liliya Bojkova-Popova, Chelmsford, MA (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 17/490,043

(22) Filed: Sep. 30, 2021

(65) Prior Publication Data

US 2023/0099791 A1    Mar. 30, 2023

(51) Int. Cl.
*G01C 21/36* (2006.01)
*G06V 20/58* (2022.01)

(52) U.S. Cl.
CPC ..... *G01C 21/3629* (2013.01); *G01C 21/3644* (2013.01); *G06V 20/58* (2022.01)

(58) Field of Classification Search
CPC . G01C 21/3629; G01C 21/3644; G06V 20/58
See application file for complete search history.

(56) References Cited

U.S. PATENT DOCUMENTS

| | | | |
|---|---|---|---|
| 6,671,226 B1 | 12/2003 | Finkel | |
| 10,278,003 B2 | 4/2019 | Satongar | |
| 2012/0136566 A1* | 5/2012 | Bamba | G01C 21/343 701/410 |
| 2018/0073886 A1* | 3/2018 | Ilse | H04R 1/32 |
| 2021/0148726 A1* | 5/2021 | Ostafew | G01C 21/3415 |
| 2021/0392456 A1* | 12/2021 | Lacoche | H04W 4/024 |

FOREIGN PATENT DOCUMENTS

EP    2700907 B1    8/2019

OTHER PUBLICATIONS

Anonymous, "Apparatus and method for locating objects for visually impair individuals in an indoor environment," Mar. 11, 2019, IP.com, "HTTPS://priorart.ip.com/IPCOM/000257775" (Year: 2019).*

(Continued)

*Primary Examiner* — Thomas E Worden
*Assistant Examiner* — Elizabeth Rose Neleski
(74) *Attorney, Agent, or Firm* — Yee & Associates, P.C.

(57) ABSTRACT

A processor may receive an information dataset. The information dataset may include object information and environment information. A processor may generate a digital twin of a physical environment. The digital twin of the physical environment may be based, at least in part, on the information dataset. A processor may simulate one or more factors on the digital twin of the physical environment. A processor may determine, responsive to simulating the one or more factors, one or more pathways to a destination. The destination may be in the physical environment.

20 Claims, 5 Drawing Sheets

(56) References Cited

OTHER PUBLICATIONS

Anonymous. "Apparatus and method for locating objects for visually impair individuals in an indoor environment." Published Mar. 11, 2019. 4 pages. Published by IP.com. https://priorart.ip.com/IPCOM/000257775.

Anonymous. "System and method for utilising citizen sensing to provide route planning for people with disabilities." Published Mar. 19, 2014. 4 pages. Published by IP.com. https://priorart.ip.com/IPCOM/000235672.

Fan, Shelly. "This AI Uses Echolocation to Follow Your Every Move." Published Jun. 23, 2019. 6 pages. Published by Singularity Hub. https://singularityhub.com/2019/06/23/this-ai-uses-echolocation-to-follow-your-every-move/.

Geronazzo, et al., "Creating an Audio Story with Interactive Binaural Rendering in Virtual Reality." Published Nov. 14, 2019. 15 pages. In Wireless Communications and Mobile Computing, vol. 2019, Article ID 1463204. Published by Hindawi. https://www.hindawi.com/journals/wcmc/2019/1463204/.

Goldstein, et al., "Acoustic analysis of the Sonic Guide." Accepted for publication Apr. 10, 1981. 8 pages. Published by The Journal of the Acoustical Society of America. https://asa.scitation.org/doi/pdf/10.1121/1.386779.

Johansson, Mathias. "VR for Your Ears: Dynamic 3D Audio Is Coming Soon." Published Jan. 24, 2019. 6 pages. Published by IEEE Spectrum. https://spectrum.ieee.org/consumer-electronics/audiovideo/vr-for-your-ears-dynamic-3d-audio-is-coming-soon.

Lalwani, Mona. "Surrounded by sound: how 3D audio hacks your brain." Published Feb. 12, 2015. 8 pages. Published by The Verge. https://www.theverge.com/2015/2/12/8021733/3d-audio-3dio-binaural-immersive-vr-sound-times-square-new-york.

Marin, et al., "Indoor Localization Techniques Within a Home Monitoring Platform." Published Sep. 3, 2020. 25 pages. Published by ARXIV. https://arxiv.org/pdf/2009.01654.pdf.

Mathur, Natasha. "Researchers introduce a deep learning method that converts mono audio recordings into 3D sounds using video scenes." Published Dec. 28, 2018. 4 pages. Published by Packt. https://hub.packtpub.com/researchers-introduce-a-deep-learning-method-that-converts-mono-audio-recordings-into-3d-sounds-using-video-scenes/.

Mell, et al., "The NIST Definition of Cloud Computing," Recommendations of the National Institute of Standards and Technology, U.S. Department of Commerce, Special Publication 800-145, Sep. 2011, 7 pgs.

Nandini, et al., "A novel path planning algorithm for visually impaired people." Published Mar. 23, 2017. 7 pages. In Journal of King Saud University—Computer and Information Sciences. Published by Science Direct. https://www.sciencedirect.com/science/article/pii/S1319157816301392.

Yadav, et al., "Fusion of Object Recognition and Obstacle Detection approach for Assisting Visually Challenged Person." Published in 2020. 4 pages. In 2020 43rd International Conference on Telecommunications and Signal Processing (TSP), pp. 537-540. Published by IEEE. https://ieeexplore.ieee.org/document/9163434.

* cited by examiner

DIGITAL TWIN BASED BINAURAL AUDIO ECHOLOCATION

BACKGROUND

The present disclosure relates generally to the field of soundwaves, and more particularly to the field using soundwaves to navigate. Echolocation, or the use of soundwaves to navigate or to identify the location of obstacles within a particular environment has been used by animals and various equipment, such as submarines. Often, using soundwaves to navigate obstacles may be useful when animals or particular equipment are in environments with little light, or have poor visibility. For example, a submarine may use echolocation techniques to identify different topographies of the ocean floor as it moves through the deep ocean.

SUMMARY

Embodiments of the present disclosure include a method, computer program product, and system for managing echolocation. A processor may receive an information dataset. The information dataset may include object information and environment information. A processor may generate a digital twin of a physical environment. The digital twin of the physical environment may be based, at least in part, on the information dataset. A processor may simulate one or more factors on the digital twin of the physical environment. A processor may determine, responsive to simulating the one or more factors, one or more pathways to a destination. The destination may be in the physical environment.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
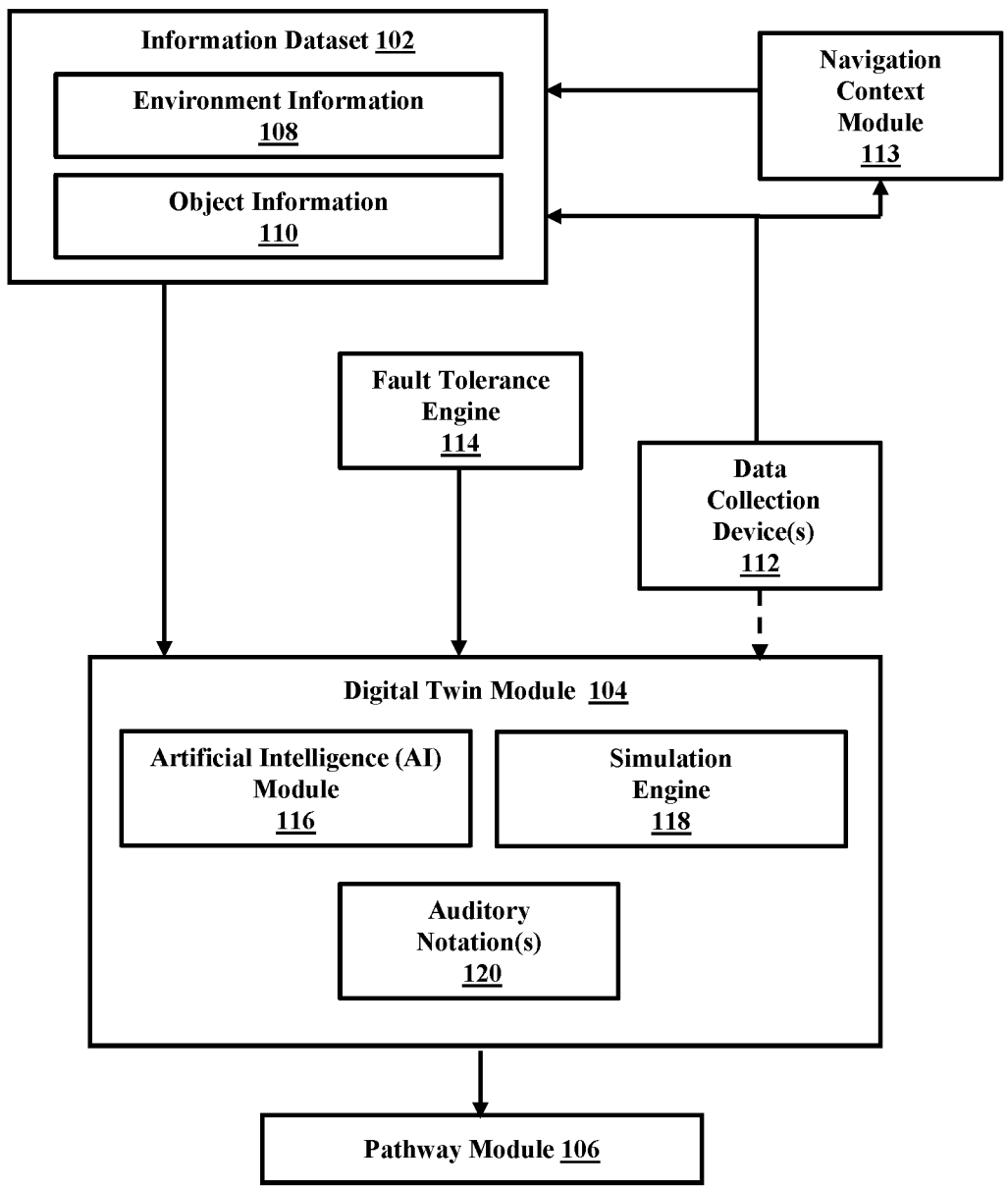
FIG. 1 depicts a block diagram of an embodiment of navigation management system, in accordance with the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of soundwaves, and more particularly to the field using soundwaves to navigate, such as echolocation. While the present disclosure is not necessarily limited to such applications, various aspects of the disclosure may be appreciated through a discussion of several examples using this context.

Echolocation is the process of locating objects within an environment by interpreting how soundwaves are reflected off of each object. While many animals have evolved hundreds of years to use echolocation to navigate and find food sources, people have also been known to use echolocation. Though people often think of submarine's using echolocation (e.g., sonar) to navigate oceans, studies show that people, with and without visual impairment, may use echolocation to navigate different environments. While echolocation may be used in different situations, there are limitations.

For example, a person may be in a clothing store when the electric fails, leaving the person in in the dark in an unfamiliar environment with a variety of unknown obstacles. In this example, even if the person were trained to use echolocation, they may be unable to perform the process if other patrons are producing interfering soundwaves (e.g., patrons speaking from multiple directions about when the lights may be turned back on). Alternatively, a person may be inside an object while navigating a particular environment, such as vehicle with few windows (e.g., such as a submarine) or in an environment with poor visibility (e.g., a car traveling in thick fog). Even were the person able to perform echolocation within the vehicle, any information the person would receive would be limited to the internal environment of the vehicle and would fail to provide any navigational information through the environment. As such, there is a desire to navigate an object (e.g., person and/or vehicle) from one location to another using echolocation.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

It will be readily understood that the instant components, as generally described and illustrated in the Figures herein, may be arranged and designed in a wide variety of different configurations. Accordingly, the following detailed description of the embodiments of at least one of a method, apparatus, non-transitory computer readable medium and system, as represented in the attached Figures, is not intended to limit the scope of the application as claimed but is merely representative of selected embodiments.

The instant features, structures, or characteristics as described throughout this specification may be combined or removed in any suitable manner in one or more embodiments. For example, the usage of the phrases "example embodiments," "some embodiments," or other similar language, throughout this specification refers to the fact that a particular feature, structure, or characteristic described in connection with the embodiment may be included in at least one embodiment. Accordingly, appearances of the phrases "example embodiments," "in some embodiments," "in other embodiments," or other similar language, throughout this specification do not necessarily all refer to the same group of embodiments, and the described features, structures, or characteristics may be combined or removed in any suitable manner in one or more embodiments. Further, in the FIGS., any connection between elements can permit one-way and/or two-way communication even if the depicted connection is a one-way or two-way arrow.

Also, any device depicted in the drawings can be a different device. For example, if a mobile device is shown sending information, a wired device could also be used to send the information. The term "module" may refer to a hardware module, software module, or a module may be a combination of hardware and software resources. Embodiments of hardware-based modules may include self-contained components such as chipsets, specialized circuitry, one or more memory devices and/or persistent storage. A software-based module may be part of a program, program code or linked to program code containing specifically programmed instructions loaded into a memory device or persistent storage device of one or more data processing systems operating as part of the computing environment (e.g., navigation management system 100).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

In embodiments discussed herein, solutions are provided in the form of a method, system, and computer program product, for managing navigation through an environment (e.g., physical environment) using AI enabled digital twin technology. In embodiments, a processor may be configured to utilize artificial intelligence enabled digital twin technology to manage the navigation of a user to a destination within the environment using echolocation (e.g., binaural audio echolocation). Such embodiments may be utilized when visibility is reduced or other forms of navigation (e.g., line of sight) are unavailable. For example, in situations where a vehicle is traveling through a heavy fog or snowstorm (e.g., whiteout conditions) to reach a particular destination, the use of headlights may not offer enough detail of the environment to allow the vehicle to safely navigate obstacles in the environment (e.g., oncoming traffic, road signs, etc.). Accordingly, embodiments contemplated herein provide solutions for navigating the user through the environment, even when the environment may not be visible to the user.

In embodiments, a processor may be configured to manage a user's navigation through an environment using augmented intelligence and/or artificial intelligence (AI) enabled digital twin technology. In embodiments, the processor may be configured to receive or collect (e.g., using one or more data collection devices) an information dataset. The processor may then use the information dataset to generate the digital twin of an environment (e.g., physical environment). An environment may include any area such as, a region (e.g., Southern California), county/city/town (e.g., Baltimore, Farmersville), a particular area within a city/town (e.g., shopping mall, museum, apartment complex, park, airport, etc.), or a building, or room with a building (e.g., office or coffee shop). The information dataset may include environment information and user information. Environment information may include layout or infrastructure data associated with the environment (e.g., physical environment) that may be required to generate a digital twin of the environment of interest.

More particularly, environment information may include a plurality of structure components including, but not limited to the, the different structures (e.g., buildings, roads, sidewalks, etc.) configured within the environment, size and dimensions of the various structures (e.g., dimensions of a room, height of ceilings, distance between each of the structures), plumbing (e.g., waterpipe systems and sewer systems), fire protection elements (e.g., flame retardant surfaces), construction elements (e.g., insulation, types of materials used to construct different structures), heating/air-conditioning (HVAC) and ventilation (e.g., air flow may affect the travel of soundwaves), electrical systems (e.g., suspended ceiling lighting), building components (e.g., windows, doors, walls, slabs, stairs), information with how a structure is decorated or organized (e.g., the location of furniture or the position of a painting hanging on a wall), open space structures (e.g., open windows without glass, open doors, etc.), and other miscellaneous structure objects (e.g., pipes, cables and ducts). The processor may be configured to also collect/receive environment information associated with the geometric shapes of the various structures within the environment. For example, a processor may receive environment information including geometric shapes of various structures such as, curves, vertices, edges, and/or multifaceted faces or surfaces.

The processor may be configured to also collect/receive environment information (e.g., via one or more data collection devices) associated with obstacles configured within the environment. A processor may identify an obstacles as anything that may affect the navigation or pathway of a user, such as tree or a person traveling down the sidewalk. Obstacles may be static obstacles and/or dynamic obstacles. A static obstacle may be generally understood to be an obstacle that has a fixed location unless the obstacle is intentionally moved. For example, a processor may determine that a sofa within a room is a static obstacle, but the sofa may be moved to another location within the room. A dynamic obstacle may be generally understood to be an obstacle that can change location or position within the environment. For example, a processor may determine that a robotic vacuum configured to autonomously vacuum a room is a dynamic obstacle. In some embodiments, a dynamic obstacle may also include a convertible obstacle that has a fixed location, but is also configured to move. These convertible obstacles may include, but are not limited to, escalators, doors, and elevators. Because soundwaves are impacted differently by different objects (e.g., structure components and/or obstacles) as well as the composition and/or changes in the object's position (e.g., doppler effect associated with moving/dynamic obstacles), the more detailed the environment information is the more accurate the digital twin of the physical environment may be.

In embodiments, a processor may be configured to collect/receive (e.g., using one or more data collection devices) user information associated with a user who intends to travel to a particular destination within the environment. The user information may include navigation context data or data generated by a user. Navigation context data may include, but is not limited to, voice audio (e.g., generated by the user), sign language, and/or gestures. User information may also include, but is not limited to, location information associated with where the user is located within the environment (e.g., via data collection device that continuously updates the user's location), data associated with a user's schedule (e.g., planned calendar events).

In some embodiments, the information dataset may also include other data associated with one or more databases. In these embodiments, a processor may access one or more pre-existing knowledge corpuses. The one or more pre-existing knowledge corpuses may include auditory notations (e.g., monaural contextual auditory notations and/or binaural auditory notations). These pre-existing knowledge corpus may include objects and their corresponding sound or audio notation. For example, the pre-existing knowledge corpuses may include an object, such as "birds," and the corresponding audio notation "chirping" sound. Other examples may include, but are not limited to, truck: honk, car: horn, dog: barking, and kitchen: cooking.

In embodiments, a processor may collect/receive the environment information and/or user information (e.g., information dataset) using one or more data collection devices. Data collection devices may include, but are not limited to, one or more sensors (e.g., LIDAR (light detection and ranging) sensors, geomagnetic sensors and acceleration sensors), IoT (Internet of Things) devices (e.g., configured to provide real-time data feed of the physical environment), weather satellites, recording systems configured to capture environment information (e.g., static and dynamic obstacles), wearable devices (e.g., watch or fitness tracking device), or other smart devices (e.g., smart cameras) configured with the environment (e.g., physical environment). One or more data collection devices may be connected or coupled to one or more structure components (e.g., buildings, telephone poles, streetlights, public transportation, etc.) within the environment. In some embodiments, a processor may configure the data collection devices to be interconnected over a network to relay data/information (e.g., environment information and/or user information) to provide a collaborative connection between the user the environment.

For example, a processor may be configured to receive user information from a data collection device attached to a telephone pole located on the street corner of a busy intersection of the environment. In this example, the processor may collect user information associated with the obstacles located on the street. While in some embodiments, a processor may only receive environment information from a particular data collection device and user information from a different, separately configured data collection device, in other embodiments, a process may configure the data collection device to collect both environment information and user information. For example, a processor could be configured to continuously receive information from a data collection device configured on a public transportation bus. In this embodiment, the data collection device could collect environment information associated with the concentrations and movement of people and vehicles (e.g., obstacles) within a particular location of the environment as well as, user information associated with identifying the location of the user within the environment and how far away the user is from other locations or landmarks (e.g., dynamic landmarks) within the environment.

In embodiments, a processor may continuously receive data (e.g., real-time data feed) associated with environment information and user information (e.g., information dataset). A processor may store this information, or historical information dataset, in an historical repository. In some embodiments, the processor maybe configured to analyze the historical information dataset (e.g., using AI and machine learning capabilities) to generate a knowledge corpus of new or updated auditory notations (e.g., monaural contextual auditory notations and/or binaural auditory notations). In embodiments, the processor may access historical information dataset to generate or update the digital twin and/or perform one or more particular simulations associated with the environment (e.g., using the digital twin).

In embodiments, a processor may use augmented intelligence and AI capabilities to generate a digital twin of the environment (e.g., physical environment). The digital twin may describe one or more structure entities, structure attributes, spatial relationships (e.g., spatial relationships between two structure components), semantics of structure entities (e.g., surface ABC is a wall) geometries of structure entities using spatial coordinates, topological relationships to structure components (e.g., window can only exist in another surface such as a wall), and physical characteristics of structure components. The digital twin may be configured using environment information and user information collected/received from real-time data feeds (e.g., using one or more data collection devices) as well as the historical information dataset stored in the historical repository.

In embodiments, the digital twin may be configured to function in the same or similar fashion as the actual physical environment would be expected to perform under similar circumstances. In some embodiments, the processor may generate a collaborative connection between the user and the digital twin of the physical environment. The initial digital twin generated by the processor may resemble a model of the physical environment, but as more real-time data (e.g., information dataset) is collected/received from the physical environment over time, the digital twin becomes a more accurate representation of the physical environment. In such embodiments, having a digital twin that more closely reflects the physical environment results in generating more accurate simulations. The digital twin may actively change as the real-time data feed provides continuously updated data associated with the information dataset. As a result, movement or actions performed by the user in the physical environment are reflected in the digital twin.

In embodiments a processor may use the digital twin to simulate one or more factors associated with the environment. A factor may be any consideration or aspect (e.g., the sudden manifestation of a plurality of dynamic obstacles, or a staircase) of environment that may affect a user navigating through one or more pathways to reach a destination (e.g., a shopping mall). For example, a factor may include, but is not limited to, the amount of time it may take a user to reach the destination (e.g., which of the one or more pathways is the most time efficient), if the user desires a pathway to the destination that avoids one or more obstacles (e.g., user wants to avoid pathways where they may have to navigate a staircase), and the distance the user may have to travel to reach the destination (e.g., user may prefer the shortest pathway to the destination). In some embodiments, data collection devices may be used to determine the relative distance of the user form the nearest data collection device (e.g., using LIDAR sensors), the distance between the user and one or more obstacles, and the distance between the user and the destination. In some embodiments, a factor may include how the user is navigating through the environment. For example, each movement (e.g., detected using a wearable device or other data collection device) within the physical environment the user makes may be associated with a factor that may be simulated by the processor using the digital twin. In embodiments, a processor may determine one or more pathways by simulating various different possible pathways a user may take to reach the destination. In embodiments, a processor may also use the digital twin to simulate static and/or dynamic obstacles and how they may affect the user's navigation through the one or more pathways.

In embodiments, a processor may predict, responsive to simulating the one or more factors, one or more pathways to a destination (e.g., coffee house, airport gate terminal, etc.) associated with the physical environment. The one or more pathways may correlate to the user's orientation (e.g., gazing direction of the user). In embodiments, a processor may analyze (e.g., using AI and machine learning capabilities) each of the one or more pathways. In these embodiments, a processor may determine, using the information dataset, a primary pathway from the one or more pathways (e.g., possible pathways). A primary pathway may be the pathway provided to the user to navigate to the destination and may represent the most accessible pathway to for the user to navigate to reach the destination. In embodiments, the one or more pathways may be static or dynamic. A static pathway may refer to one or more of the predicted pathways that will not be changed as the user navigates (e.g., receiving auditory notations) the pathway. A dynamic pathway may refer to one or more of the predicted pathways that can change as a result of one or more factors (e.g., dynamic obstacles) initiating the user to change course. In these embodiments, a processor may simulate the one or more factors and where the user is located within the environment to chart an updated pathway to the destination. For example, a user may be receiving navigation instructions (e.g., auditory notations) associated with a dynamic pathway (e.g., the primary pathway) that require the user to use an elevator. In this example, a processor could determine that the elevator is stuck and no longer operable. As such, the processor may change the dynamic pathway to a new/updated pathway (e.g., secondary pathway) that allows the user to reach their destination. In these embodiments, a processor may correlate the user's orientation (e.g., direction of user's gaze) within the environment in real time.

In embodiments, a processor may identify different types of obstacles within the environment. The processor may use AI and machine learning capabilities to analyze the information dataset and/or the historical information dataset from the historical repository for one or more different types of obstacles. In these embodiments, the processor may determine if any of the structures or structure components within the environment are static (e.g., a railing positioned alongside a sidewalk), dynamic (e.g., person or animal), and/or a convertible obstacle (e.g., doors and elevators).

In embodiments, a processor may use the digital twin as well as AI and machine learning capabilities to generate monaural contextual auditory notations. In these embodiments, the monaural contextual auditory notations may be based on the one or more pathways (e.g., primary pathway), the context of navigation, and the pre-existing knowledge corpus having the object and corresponding sound.

In embodiments, a processor may use the digital twin as well as AI and machine learning capabilities to generate binaural auditory notations. Binaural auditory notations may augment the auditory notation or pre-existing auditory notations to generate two different versions of the sound that may be separately detected by a user's two ears, respectively. As such, as the user moves and turns in the physical environment, the binaural auditory notations may be modified in real-time to maintain consistency for the user. Such embodiments enable the user to continuously hear the binaural auditory notation generated from an absolute source location (e.g., echolocation) as the user navigates the pathway (e.g., primary pathway) to the destination. The binaural auditory notations may be based on the simulations of the one or more pathways and the information dataset (e.g., total distance of the pathway, interaural time difference, spectral localization cues, actual path of the pathway, directional changeover points in the pathways etc.) using the digital twin. In some embodiments, a processor may be configured to perform binaural filtering using AI and machine learning capabilities.

In embodiments, a processor may use binaural auditory notations to aid the user in navigating the pathway. Binaural auditory notations may indicate to the user when the user should change directions, which direction the user should go (e.g., left or right turn), may alert the user of a static obstacle or dynamic obstacle (e.g., a piece of furniture or another person) that the user may be approaching, and if the user is in possible danger of collision with an obstacle or falling or stumbling on an uneven or inclined/declined floor. In embodiments, the processor may generate binaural auditory notations that enable the user to spatially orient their body relative to different objects (e.g., obstacles or structures) within the environment. Such embodiments allow the user to navigate the environment via a primary pathway to the destination.

In an example embodiment, a processor could detect a user in the physical environment. As contemplated herein, a processor may generate a digital twin of the physical environment to simulate and predict the one or more pathways a user may take to reach their destination (e.g., a bookstore or workspace). The processor may detect an obstacle in the physical environment from the information dataset (e.g., environment information). Obstacle may be analyzed and determined to be either a static or dynamic obstacle. The processor may receive data associated with the obstacle from a real-time data feed from one or more data collection devices configured within the physical environment. The processor may use the digital twin and simulations to determine the position of the obstacle. In embodiments, where the processor identifies the obstacle as a dynamic obstacle, such as a person walking in the physical environment, the processor may use the digital twin to predict how the dynamic obstacle may influence or affect the one or more pathways a user may take. Based on this prediction, a processor may select a pathway (e.g., primary pathway) from the one or more pathways, that allows a user to avoid the obstacle. The processor may then generate auditory notations, such as binaural auditory notations and/or monaural contextual auditory notations, to aid in navigating the user along the pathway (e.g., primary pathway) to the destination.

In some embodiments, a user may provide a processor with personal information (e.g., of a recent injury). In these embodiments, a processor may utilize the personal information to determine which of the one or more pathways addresses the user's personal information. In an example embodiment, a user could provide the processor with information that they twisted and injured their ankle. In such an embodiment, the processor may use the personal information to select or identify which pathway of the one or more pathways mitigates or reduces stress on the user's ankle. The processor may determine that the pathway that includes the user climbing a staircase would stress the user's ankle while the pathway that includes an elevator may be selected as the pathway (e.g., primary pathway) recommended to the user.

In some embodiments, a processor may dynamically modulate the frequency, intensity, time differences (e.g., differences in time that sound may take to reach each ear of a user), of an auditory notation. In these embodiments, a processor may combine two or more auditory notations to aid in navigating the user along the pathway to the destination. In some embodiments, a processor may issue an alert auditory notation when the user may incur on possible interactions with static or dynamic obstacles in the pathway.

In embodiments, a processor may generate a dynamic landmark. A dynamic landmark may be identified as a particular pattern in the digital twin of the physical environment. This particular pattern or dynamic landmark may be used by the processor to determine the accuracy level of the information dataset. Dynamic landmarks may be location points within the digital twin environment that may be associated with distinct and recognizable patters that may be observed in the physical environment (e.g., using sensing data from data collection devices). Dynamic landmarks may include, but are not limited to, acceleration landmarks, orientation landmarks (e.g., turns a user takes), pressure landmarks (e.g., changes in altitude associated with elevators or stairs), visual landmarks, audio landmarks, and magnetic landmarks. The aforementioned dynamic landmarks may be used to determine the accuracy level of what is occurring in the physical environment to what is occurring in the digital twin environment. For example, the recognizable pattern that may be associated with an acceleration landmarks may be the number of doors the user passed in a particular timeframe.

Referring now to FIG. 1, a block diagram of navigation management system 100 for managing the navigation of a user through an environment using echolocation, is depicted in accordance with embodiments of the present disclosure. FIG. 1 provides an illustration of only one implementation and does not imply any limitations with regard to the environments in which different embodiments may be implemented. Many modifications to the depicted environment may be made by those skilled in the art without departing from the scope of the invention as recited by the claims.

In embodiments, navigation management system 100 may include information dataset 102, digital twin module 104, and pathway module 106. In embodiments, navigation management system 100 may be configured to receive information dataset 102. Information dataset 102 may include environment information 108 and object information 110. In embodiments, navigation management system 100 may receive/collect information dataset 102 from a historical repository. In embodiments, data collection device(s) 112 may be configured to collect environment information 108 and object information 110 from the physical environment and/or an object occupying the physical environment. While in some embodiments, data collection devices 112 may be configured to collect/receive navigation context information associated with navigation context module 113 (e.g., detecting voice audio, and gestures associated with navigation.), in other embodiments, navigation context information may be included and collected in object information 110.

In embodiments, navigation management system 100 may be configured to generate a digital twin of the physical environment using digital twin module 104. In embodiments, digital twin module 104 may be configured to include AI module 116 and simulation engine 118. In embodiments, navigation management system 100 may configure AI module 116 and simulation engine 118 to generate any number of simulations using the digital twin of the physical environment to simulate one or more factors (e.g., how different obstacles affect different pathways in the environment). In embodiments, simulation engine 118 may predict or identify one or more pathways associated with a particular destination within the physical environment. In some embodiments, pathway module 106 may be configured to consider the one or more pathways simulated using digital twin module 104. In some embodiments, navigation management system 100 may include fault tolerance engine 114. Fault tolerance engine 114 may enable digital twin module 104 and/or simulation engine 118 to continue to generate a digital twin and/or produce simulation associated with the digital twin as intended or at a reduced level if some portion of navigation management system 100 is missing particular information (e.g., a portion of the information dataset is corrupted and no longer usable) or one or more system components fail. Fault tolerance engine 114 may ensure that the entire system does not fail when one or more components fail.

While in some embodiments, pathway module 106 may be configured within simulation engine 118, in other embodiments, pathway module 106 is situated independently of simulation engine 118. Pathway module 106 may analyze environment information 108 and object information 110 to determine an accessibility rating for each of the one or more pathways identified by digital twin module 104. In embodiments, pathway module 106 may identify the pathway having the highest accessibility rating as a primary pathway. In embodiments, navigation management system 100 may generate one or more auditory notations 120 (e.g., using AI module 116) in the physical environment to direct/navigate the object through the primary pathway to the destination, using echolocation based principles to avoid obstacles and possible hazards.

Figure 2:
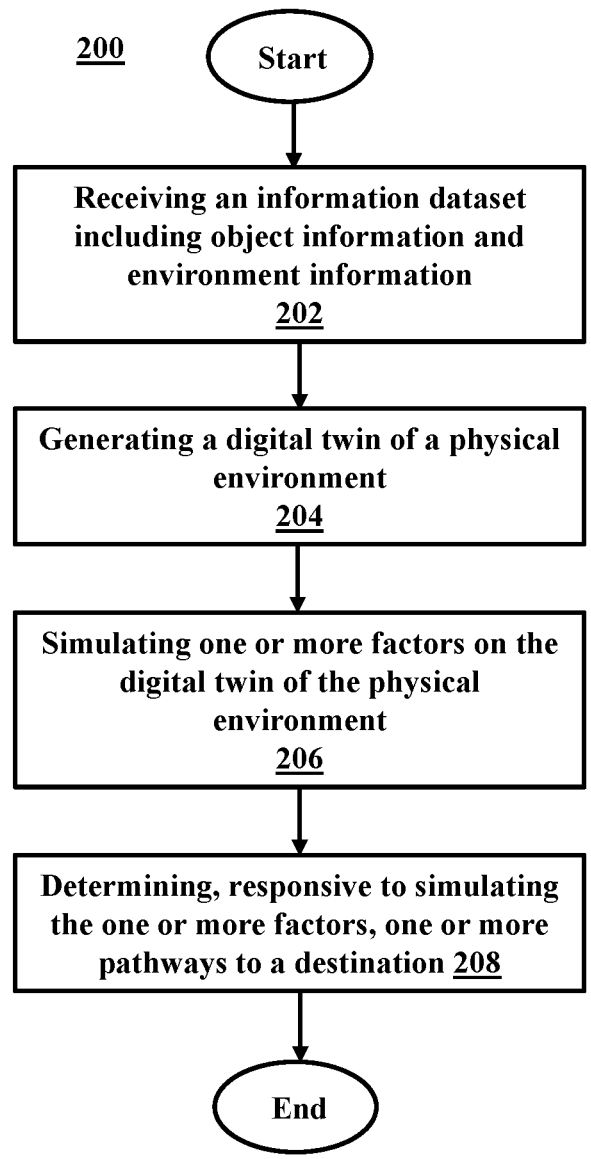
FIG. 2 illustrates a flowchart of a method for managing navigation, in accordance with embodiments of the present disclosure.

Referring now to FIG. 2, a flowchart illustrating an example method 200 for managing navigation in an environment (e.g., physical environment), in accordance with embodiments of the present disclosure. FIG. 2 provides an illustration of only one implementation and does not imply any limitations with regard to the environments in which different embodiments may be implemented. Many modifications to the depicted environment may be made by those skilled in the art without departing from the scope of the invention as recited by the claims.

In some embodiments, the method 200 begins at operation 202 where a processor may receive an information dataset. In embodiments, information dataset may include object information and environment information. In some embodiments, the method 200 proceeds to operation 204.

At operation 204, a processor may generate a digital twin of a physical environment. In some embodiments, the digital twin of the physical environment may be based, at least in part, on the information dataset. In some embodiments, the method 200 proceeds to operation 206.

At operation 206, a processor may simulate one or more factors on the digital twin of the physical environment. In some embodiments, the method 200 proceeds to operation 208.

At operation 208, a processor may determine, responsive to simulating the one or more factors, one or more pathways to a destination. In embodiments, the destination may be in the physical environment. In some embodiments, as depicted in FIG. 2, after operation 208, the method 200 may end.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3A:
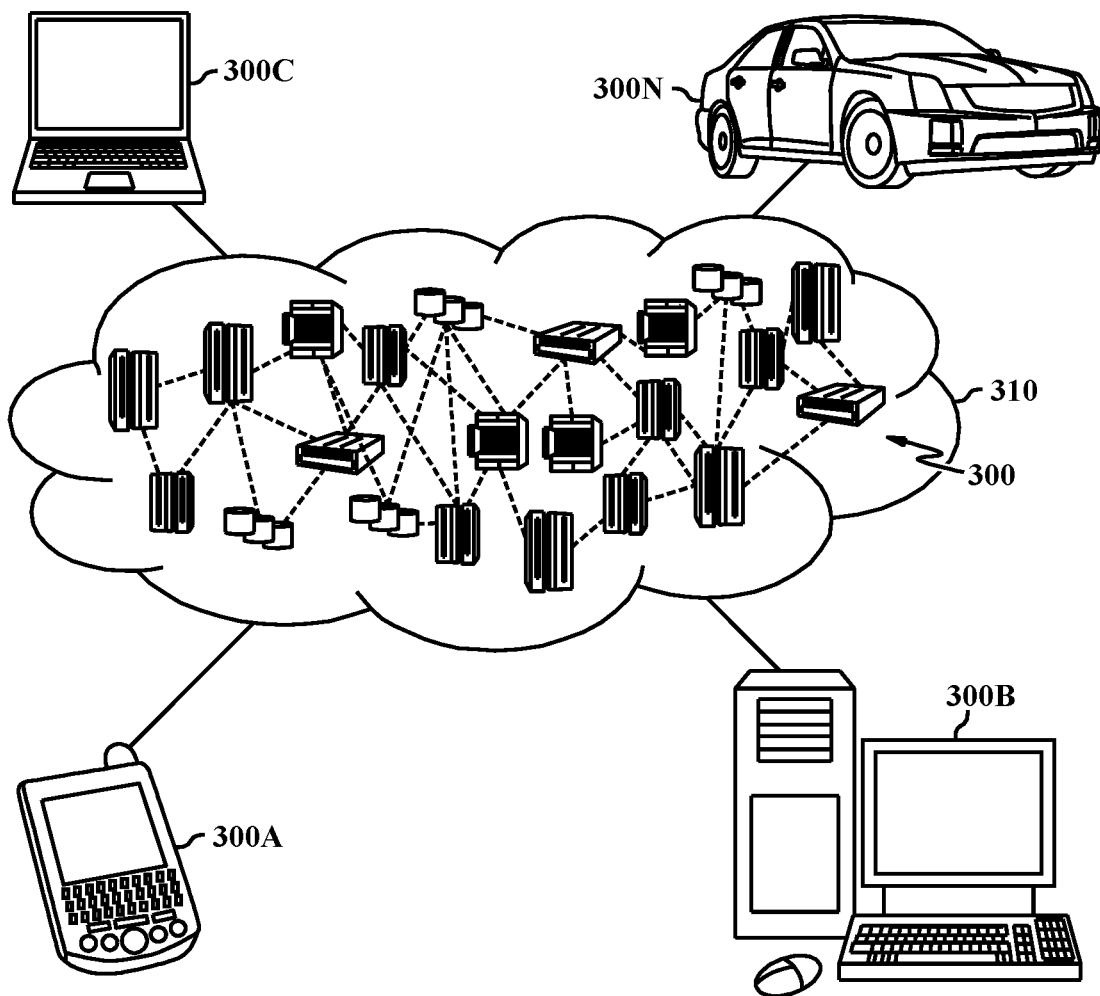
FIG. 3A illustrates a cloud computing environment, in accordance with embodiments of the present disclosure.

Referring now to FIG. 3A, illustrative cloud computing environment 310 is depicted. As shown, cloud computing environment 310 includes one or more cloud computing nodes 300 with which local computing devices used by cloud consumers, such as, for example, personal digital assistant (PDA) or cellular telephone 300A, desktop computer 300B, laptop computer 300C, and/or automobile computer system 300N may communicate. Nodes 300 may communicate with one another. They may be grouped (not shown) physically or virtually, in one or more networks, such as Private, Community, Public, or Hybrid clouds as described hereinabove, or a combination thereof. This allows cloud computing environment 310 to offer infrastructure, platforms and/or software as services for which a cloud consumer does not need to maintain resources on a local computing device. It is understood that the types of computing devices 300A-N shown in FIG. 3A are intended to be illustrative only and that computing nodes 300 and cloud computing 300 and cloud computing environment 310 can communicate with any type of computerized device over any type of network and/or network addressable connection (e.g., using a web browser).

Figure 3B:
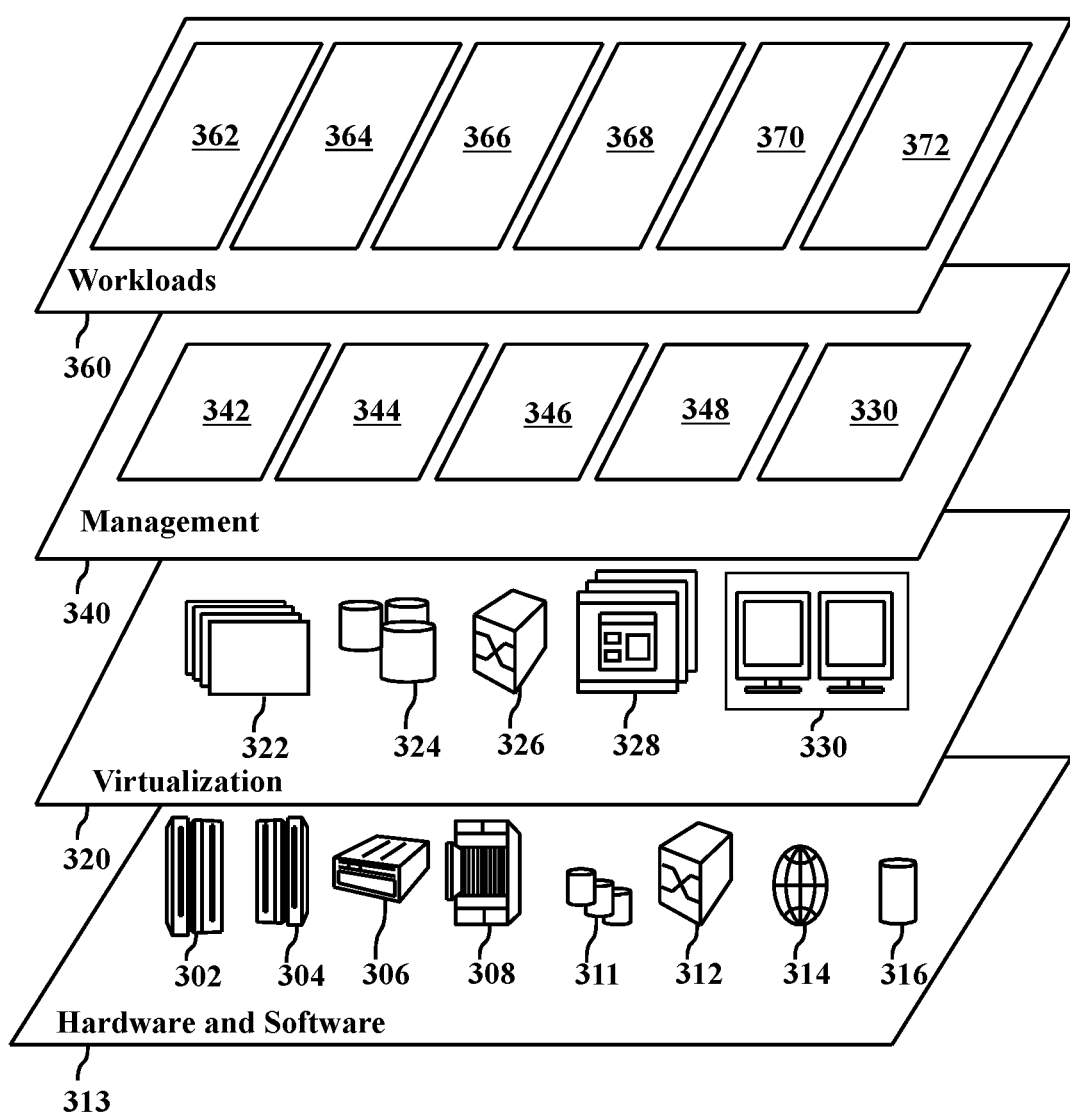
FIG. 3B illustrates abstraction model layers, in accordance with embodiments of the present disclosure.

Referring now to FIG. 3B, a set of functional abstraction layers provided by cloud computing environment 310 (FIG. 3A) is shown. It should be understood in advance that the components, layers, and functions shown in FIG. 3B are intended to be illustrative only and embodiments of the disclosure are not limited thereto. As depicted below, the following layers and corresponding functions are provided.

Hardware and software layer 315 includes hardware and software components. Examples of hardware components include: mainframes 302; RISC (Reduced Instruction Set Computer) architecture based servers 304; servers 306; blade servers 308; storage devices 311; and networks and networking components 312. In some embodiments, software components include network application server software 314 and database software 316.

Virtualization layer 320 provides an abstraction layer from which the following examples of virtual entities may be provided: virtual servers 322; virtual storage 324; virtual networks 326, including virtual private networks; virtual applications and operating systems 328; and virtual clients 330.

In one example, management layer 340 may provide the functions described below. Resource provisioning 342 provides dynamic procurement of computing resources and other resources that are utilized to perform tasks within the cloud computing environment. Metering and Pricing 344 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 346 provides access to the cloud computing environment for consumers and system administrators. Service level management 348 provides cloud computing resource allocation and management such that required service levels are met. Service Level Agreement (SLA) planning and fulfillment 350 provide pre-arrangement for, and procurement of, cloud computing resources for which a future requirement is anticipated in accordance with an SLA.

Workloads layer 360 provides examples of functionality for which the cloud computing environment may be utilized. Examples of workloads and functions which may be provided from this layer include: mapping and navigation 362; software development and lifecycle management 364; virtual classroom education delivery 366; data analytics processing 368; transaction processing 370; and navigation managing 372.

Figure 4:
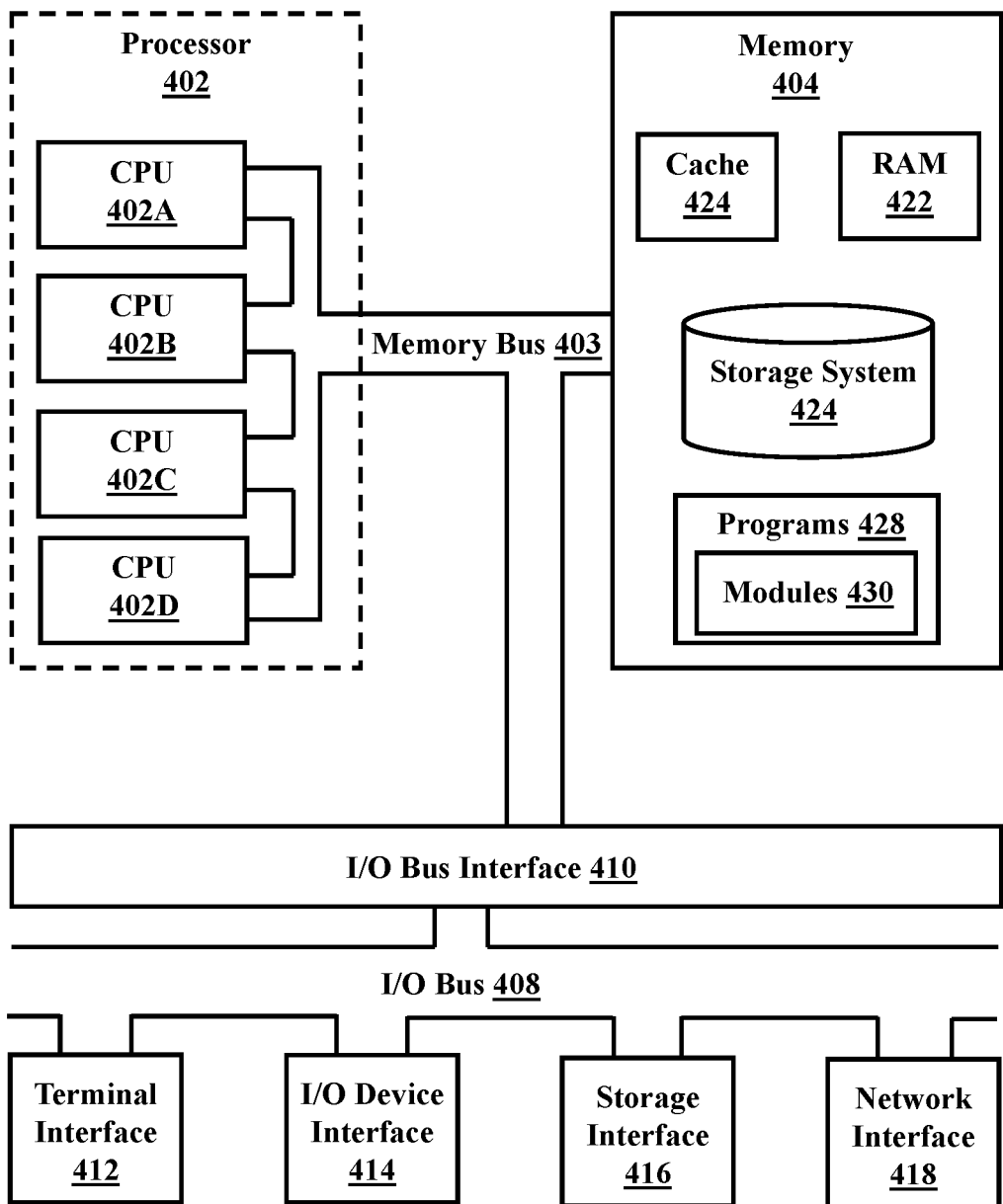
FIG. 4 illustrates a high-level block diagram of an example computer system that may be used in implementing one or more of the methods, tools, and modules, and any related functions, described herein, in accordance with embodiments of the present disclosure.

FIG. 4, illustrated is a high-level block diagram of an example computer system 401 that may be used in implementing one or more of the methods, tools, and modules, and any related functions, described herein (e.g., using one or more processor circuits or computer processors of the computer), in accordance with embodiments of the present invention. In some embodiments, the major components of the computer system 401 may comprise one or more Processor 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 428 and/or program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smartphone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method of managing navigation in a physical environment, the method comprising:
    receiving, by a processor, an information dataset from a real-time data feed, wherein the information dataset includes object information, user information, and environment information;
    generating a digital twin of a physical environment and a user, wherein the digital twin of the physical environment is based, at least in part, on the information dataset, and wherein the digital twin of the physical environment and the user are actively changing as the real-time data feed provides continuously updated data associated with the information dataset;
    simulating one or more factors on the digital twin of the physical environment;
    identifying a dynamic landmark from the digital twin, wherein the dynamic landmark is a particular parameter change associated with the physical environment;
    determining an accuracy level of the information dataset based on observing the dynamic landmark in the physical environment and the digital twin;
    predicting, responsive to simulating the one or more factors, one or more pathways to a destination, wherein the destination is in the physical environment;
    identifying a user limitation from the user information and digital twin, wherein the user limitation reflects a physical condition suffered by the user;
    identifying a particular pathway from the one or more pathways, based on the user limitation; and
    generating one or more binaural auditory notations to the user associated with the particular pathway.

2. The method of claim 1, wherein the information dataset is received from the real-time data feed associated with one or more data collection devices.

3. The method of claim 1, wherein the one or more binaural auditory notations direct the user to a primary pathway of the one or more pathways.

4. The method of claim 1, wherein predicting the one or more pathways to the destination, includes:
    detecting a static obstacle in the environment from the environment information; and
    identifying a primary pathway from the one or more pathways, wherein the primary pathway avoids the static obstacle.

5. The method of claim 1, wherein predicting the one or more pathways to the destination, includes:
    detecting the dynamic obstacle in the physical environment from the environment information;
    receiving a real-time data feed from one or more data collection devices, wherein the real-time data feed includes environment information associated with the dynamic obstacle;
    simulating the digital twin of the physical environment to predict a position of the dynamic obstacle; and
    identifying a primary pathway from the one or more pathways, wherein the primary pathway avoids the dynamic obstacle.

6. The method of claim 1, further comprising:
    generating one or more updated binaural auditory notations, wherein the one or more updated binaural auditory notations are based, at least in part, on the digital twin.

7. The method of claim 1, wherein the dynamic landmark includes a pressure landmark associated with one or more changes in pressure at one or more different location points in the physical environment.

8. A system for managing navigation in a physical environment, the system comprising:
    a memory; and
    a processor in communication with the memory, the processor being configured to perform operations comprising:
        receiving an information dataset from a real-time data feed, wherein the information dataset includes object information, user information, and environment information;
        generating a digital twin of a physical environment and a user, wherein the digital twin of the physical environment is based, at least in part, on the information dataset, and wherein the digital twin of the physical environment and the user are actively changing as the real-time data feed provides continuously updated data associated with the information dataset;
        simulating one or more factors on the digital twin of the physical environment;
        identifying a dynamic landmark from the digital twin, wherein the dynamic landmark is a particular parameter change associated with the physical environment;
        determining an accuracy level of the information dataset based on observing the dynamic landmark in the physical environment and the digital twin;
        predicting, responsive to simulating the one or more factors, one or more pathways to a destination, wherein the destination is in the physical environment;
        identifying a user limitation from the user information and digital twin, wherein the user limitation reflects a physical condition suffered by the user;
        identifying a particular pathway from the one or more pathways, based on the user limitation; and
        generating one or more binaural auditory notations to the user associated with the particular pathway.

9. The system of claim 8, wherein the information dataset is received from the real-time data feed associated with one or more data collection devices.

10. The system of claim 8, wherein the one or more binaural auditory notations direct the user to a primary pathway of the one or more pathways.

11. The system of claim 8, wherein predicting the one or more pathways to the destination, includes:
    detecting a static obstacle in the environment from the environment information; and identifying a primary pathway from the one or more pathways, wherein the primary pathway avoids the static obstacle.

12. The system of claim 8, wherein predicting the one or more pathways to the destination, includes:
   detecting the dynamic obstacle in the physical environment from the environment information;
   receiving a real-time data feed from one or more data collection devices, wherein the real-time data feed includes environment information associated with the dynamic obstacle;
   simulating the digital twin of the physical environment to predict a position of the dynamic obstacle; and
   identifying a primary pathway from the one or more pathways, wherein the primary pathway avoids the dynamic obstacle.

13. The system of claim 8, further comprising:
   generating one or more updated binaural auditory notations, wherein the one or more updated binaural auditory notations are based, at least in part, on the digital twin.

14. The system of claim 8, wherein the dynamic landmark includes a pressure landmark associated with one or more changes in pressure at one or more different location points in the physical environment.

15. A computer program product for managing navigation in a physical environment, the computer program product comprising a computer readable storage medium having program instructions embodied therewith, the program instructions executable by a processor to cause the processors to perform a function, the function comprising:
   receiving an information dataset from a real-time data feed, wherein the information dataset includes object information, user information, and environment information;
   generating a digital twin of a physical environment and a user, wherein the digital twin of the physical environment is based, at least in part, on the information dataset, and wherein the digital twin of the physical environment and the user are actively changing as the real-time data feed provides continuously updated data associated with the information dataset;
   simulating one or more factors on the digital twin of the physical environment;
   identifying a dynamic landmark from the digital twin, wherein the dynamic landmark is a particular parameter change associated with the physical environment;
   determining an accuracy level of the information dataset based on observing the dynamic landmark in the physical environment and the digital twin;
   predicting, responsive to simulating the one or more factors, one or more pathways to a destination, wherein the destination is in the physical environment;
   identifying a user limitation from the user information and digital twin, wherein the user limitation reflects a physical condition suffered by the user;
   identifying a particular pathway from the one or more pathways, based on the user limitation; and
   generating one or more binaural auditory notations to the user associated with the particular pathway.

16. The computer program product of claim 15, wherein the information dataset is received from the real-time data feed associated with one or more data collection devices.

17. The computer program product of claim 15, wherein the one or more binaural auditory notations direct the user to a primary pathway of the one or more pathways.

18. The computer program product of claim 15, wherein predicting the one or more pathways to the destination, includes:
   detecting a static obstacle in the environment from the environment information; and
   identifying a primary pathway from the one or more pathways, wherein the primary pathway avoids the static obstacle.

19. The computer program product of claim 15, wherein predicting the one or more pathways to the destination, includes:
   detecting the dynamic obstacle in the physical environment from the environment information;
   receiving a real-time data feed from one or more data collection devices, wherein the real-time data feed includes environment information associated with the dynamic obstacle;
   simulating the digital twin of the physical environment to predict a position of the dynamic obstacle; and
   identifying a primary pathway from the one or more pathways, wherein the primary pathway avoids the dynamic obstacle.

20. The computer program product of claim 15, wherein the dynamic landmark includes a pressure landmark associated with one or more changes in pressure at one or more different location points in the physical environment.

* * * * *